(12) United States Patent
Kanazawa

(10) Patent No.: US 7,782,737 B2
(45) Date of Patent: Aug. 24, 2010

(54) OPTICAL INTEGRATED UNIT AND OPTICAL PICKUP APPARATUS INCLUDING THE SAME

(75) Inventor: Yasunori Kanazawa, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 932 days.

(21) Appl. No.: 11/433,119

(22) Filed: May 12, 2006

(65) Prior Publication Data
US 2007/0019526 A1 Jan. 25, 2007

(30) Foreign Application Priority Data
May 13, 2005 (JP) .............................. 2005-141907

(51) Int. Cl.
*G11B 7/135* (2006.01)
(52) U.S. Cl. .............................. 369/112.1; 369/112.05; 369/112.14; 369/112.15; 369/112.17; 369/112.21; 369/103; 257/98
(58) Field of Classification Search ....................... None
See application file for complete search history.

(56) References Cited

U.S. PATENT DOCUMENTS

| | | | | |
|---|---|---|---|---|
| 5,541,906 A | * | 7/1996 | Kobayashi | 369/44.23 |
| 5,790,504 A | * | 8/1998 | Hayashi et al. | 369/112.12 |
| 6,529,454 B1 | * | 3/2003 | Asoma et al. | 369/44.12 |
| 6,542,447 B1 | * | 4/2003 | Matsuo et al. | 369/44.23 |
| 6,556,533 B1 | * | 4/2003 | Fukakusa et al. | 369/112.19 |
| 6,654,320 B2 | * | 11/2003 | Fukakusa et al. | 369/44.14 |
| 6,853,042 B2 | | 2/2005 | Yoshida et al. | |
| 6,868,055 B2 | * | 3/2005 | Ueyama et al. | 369/112.15 |
| 7,348,615 B2 | * | 3/2008 | Koizumi | 257/292 |
| 2004/0240334 A1 | * | 12/2004 | Nagata et al. | 369/44.14 |
| 2007/0242572 A1 | * | 10/2007 | Ogata | 369/44.14 |

FOREIGN PATENT DOCUMENTS

| | | |
|---|---|---|
| JP | 04-295648 | 10/1992 |
| JP | 11-312334 A | 11/1999 |
| JP | 2001-250257 | 9/2001 |
| JP | 2003-101063 | 4/2003 |

\* cited by examiner

*Primary Examiner*—Joseph H Feild
*Assistant Examiner*—Ifedayo Iluyomade
(74) *Attorney, Agent, or Firm*—Edwards Angell Palmer & Dodge LLP; David G. Conlin; William J. Daley, Jr.

(57) ABSTRACT

An optical integrated unit of the present invention includes: a semiconductor laser that is a light source; at least one light receiving element; a light dividing section which divides outgoing light from the semiconductor laser and returning light from an optical disc, and reflects the returning light so as to guide it to the light receiving element; and a support substrate, and a second support substrate is concave, the light dividing section includes at least three prisms, the prisms on both sides of the light dividing section are respectively adhered to two protrusions of the concave second support substrate, and the light receiving element is adhered to the light dividing section via a cover glass. With this, it is possible to solve a problem of a conventional technology, that is, such a problem that the light receiving element cannot be adjusted highly accurately because of the thickness errors of the support substrate and the relay substrate.

11 Claims, 13 Drawing Sheets

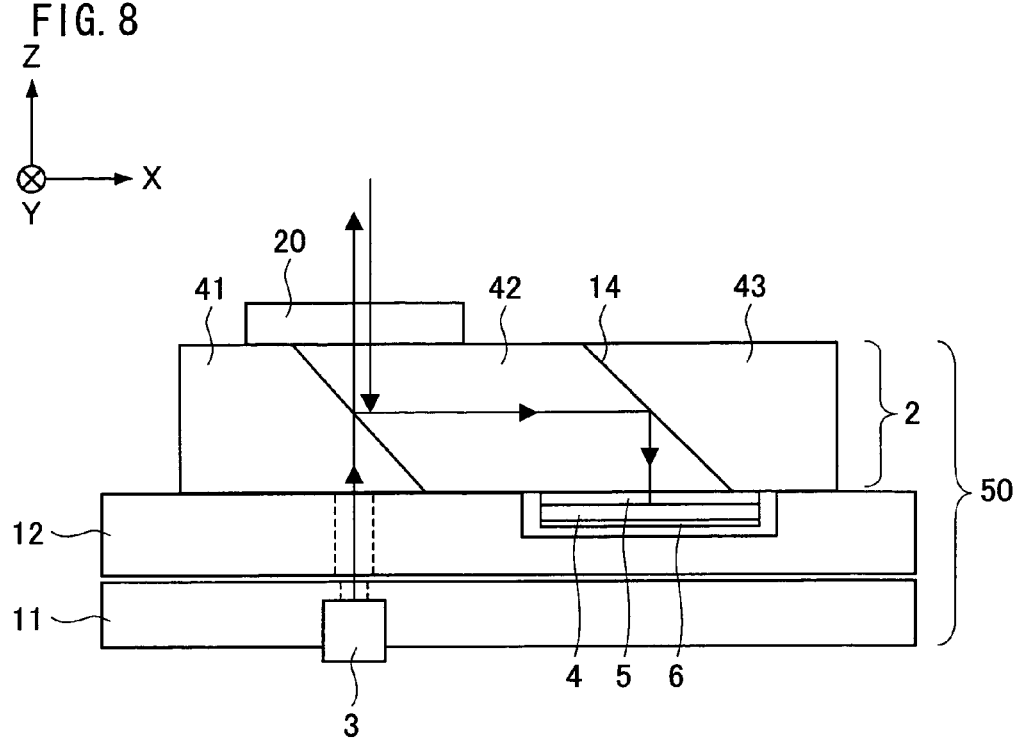
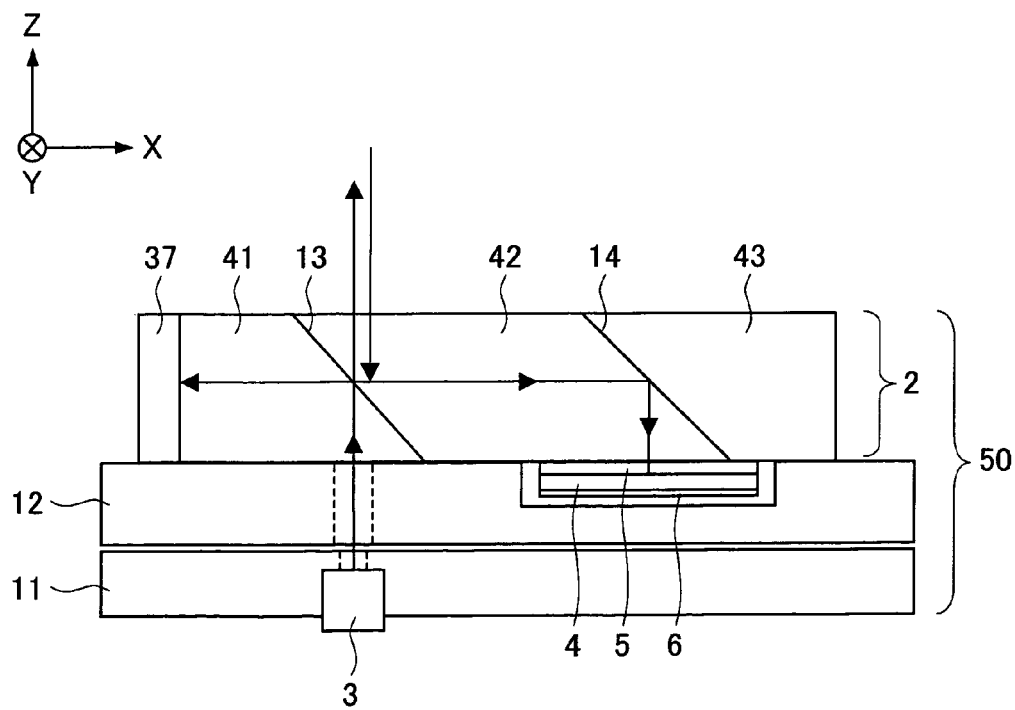

OPTICAL INTEGRATED UNIT AND OPTICAL PICKUP APPARATUS INCLUDING THE SAME

This Nonprovisional application claims priority under 35 U.S.C. §119(a) on Patent Application No. 141907/2005 filed in Japan on May 13, 2005, the entire contents of which are hereby incorporated by reference.

FIELD OF THE INVENTION

The present invention relates to (i) an optical integrated unit for realizing miniaturization of an optical pickup apparatus used when recording information to or reproducing information from an information recording medium such as an optical disc, and (ii) an optical pickup apparatus using this optical integrated unit.

BACKGROUND OF THE INVENTION

In recent years, it has been strongly desired to (i) increase the density and capacity of the information storage capacity of an optical recording medium, such as an optical disc, in order to record large volumes of information to the optical recording medium and (ii) reduce the size and weight of an optical pickup apparatus in order to improve the mobility of the optical pickup apparatus.

To reduce the size and weight of the optical pickup apparatus, various integrated pickups have been proposed. Many of these integrated pickups use an optical integrated unit into which optical components are integrated.

Generally, the optical integrated unit includes: a semiconductor laser that is a light source; a light dividing section which divides outgoing light from the semiconductor laser and returning light from the information recording medium such as the optical disc; a light receiving element which converts the returning light into an electric signal; and a support substrate.

Japanese Unexamined Patent Publication No. 101063/2003 (Tokukai 2003-101063, published on Apr. 4, 2003) proposes an optical integrated unit including a semiconductor laser, a light dividing section, a light receiving element, a support substrate, and an intermediate member provided between the light receiving element and the support substrate.

Referring to FIGS. 12 and 13, the following will explain the principle of this optical integrated unit and the principle of an optical information reproducing apparatus using this optical integrated unit. FIG. 13 is a diagram showing the configuration of an optical integrated unit 100. The optical integrated unit 100 includes a support substrate 101, a light dividing section 102, a semiconductor laser 103, a light receiving element 104, and a relay substrate 105 provided between the light receiving element 104 and the support substrate 101.

The light dividing section 102 is attached to one surface of the support substrate 101, and includes at least one lens, prism, and diffraction element. On another surface of the support substrate 101, the semiconductor laser 103 that is a light source, the light receiving element 104 and the relay substrate 105 are provided.

The support substrate 1 has (i) a first opening 108 for allowing a light beam, emitted from the semiconductor laser 103, to travel to the light dividing section 102 and (ii) a second opening 109 for guiding the returning light, from the information recording medium such as the optical disc, to the light receiving element 104.

The relay substrate 105 has a third opening 106 for guiding the returning light, from the information recording medium such as the optical disc, to the light receiving element 104. In addition, the relay substrate 105 includes a conductive wiring 107 on its major surface.

Next, referring to FIG. 14, the following will explain a method for assembling an integrated unit 100. The light receiving element 104 is attached to the relay substrate 105 in advance. That is, electrode terminals of the light receiving element 104 are electrically and physically connected to the wirings 107 of the relay substrate 105 via wiring ball bumps 110. Further, a small amount of ultraviolet curing resin is supplied to four corners of the light receiving element 104 and four corners of the relay substrate 105, and is cured. This assures the physical adhesive strength between the light receiving element 104 and the relay substrate 105. In the following description, the light receiving element 104 and the relay substrate 105 are termed a light receiving unit 111 as an integral unit.

The semiconductor laser 103 and the light dividing section 102 are attached to the support substrate 101 by adhesion. Further, after the positioning of the light receiving unit 111, the light receiving unit 111 is adhered to the support substrate 101 to which the light dividing section 102 and the semiconductor laser 103 are attached. This positioning is carried out by using a method for (i) emitting light from the semiconductor laser 103 to the optical disc 130, (ii) receiving returning light, from the optical disc 130, by the light receiving unit 111, and (iii) adjusting the position of the light receiving unit 111 on the basis of an output signal of the light receiving unit 111. This is termed an active alignment. The following will explain the active alignment in reference to FIG. 15. The light receiving unit 111 is moved and adjusted while being in contact with the support substrate 101 by a collet 120 at all times. Since the light receiving unit 111 is in contact with the support substrate 101 at all times, the length of a light path from the optical disc 130 to the light receiving element 104 is held constant at all times.

Moreover, the collet 120 is provided with a prober 121, and the prober 121 takes the output signal from the light receiving element 104.

As shown in FIG. 16, the light receiving element 104 includes (i) light receiving portions A, B, C, and D which receive the returning light and divide it into four, (ii) light receiving portions E, I, and F which are provided on one side of the light receiving portions A, B, C, and D, receive the returning light, and divide it into three, (iii) light receiving portions G, J, and H which are provided on another side of the light receiving portions A, B, C, and D, receive the returning light, and divide it into three, and (iv) light receiving portions K and L. Here, a focus error signal is detected by Astigmatism focus error detection and by utilizing the light received by the light receiving portions A, B, C, and D, a tracking error signal is detected by Push-Pull method and by utilizing the light received by the light receiving portions E, I, F, G, J, and H, and an RF signal is detected by utilizing the light received by the light receiving portions K and L. Here, the position of the light receiving unit 111 can be adjusted by carrying out a calculation(s) using the output signals from respective light receiving portions. That is, the following formula is used regarding a track direction that is along a recording track on the optical disc.

$$(A+D)-(B+C)$$

In addition, one of the following two formulas is used regarding a radial direction that is perpendicular to the recording track on the optical disc.

$$(A+B)-(C+D)$$

$$(E+G)-(F+H)$$

Moreover, the adjustment regarding misalignment in a light axis direction is carried out by causing the semiconductor laser 103 to move in the light axis direction or by placing a spacer between the light receiving unit 111 and the support substrate 101. Thus, the assembly of the optical integrated unit is completed.

Next, referring to FIG. 12, the following will explain the optical integrated unit and the optical pickup apparatus using the optical integrated unit. The light beam emitted from the semiconductor laser 103 passes through the first opening 108 of the support substrate 101, and passes through the light dividing section 102 without change. The light beam is converted into parallel light by a collimator lens 125, and then enters into an objective lens 126. The light beam focuses on the optical disc 130 by the objective lens 126, and is reflected by the optical disc 130. The reflected light passes through the objective lens 126 and the collimator lens 125, and enters into the light dividing section 102. The light beam is reflected by a first surface 122, and changes its traveling direction to an X direction. Further, part of the light beam is reflected by a second surface 123, but the rest of the light beam passes through the second surface 123 and is reflected by a third surface 124. These reflected beams pass through a lens 127 or a lens 128, and focus on the light receiving element 104.

However, in the above-described conventional example, since the light dividing section and the light receiving element are adhered to each other via the support substrate, the thickness error of the support substrate and the thickness error of the relay substrate provided between the light receiving element and the support substrate become the length error of the light path. Therefore, it is impossible to adjust the light receiving element highly accurately. Further, since the length error of the light path causes the loss of signal, it is impossible to provide a reliable optical integrated unit and an optical pickup apparatus using this optical integrated unit.

In order to eliminate the length error of the light path, used here is a method for causing the semiconductor laser to move in the light axis direction so as to cancel the thickness error in the light axis direction. However, in this method, the semiconductor laser that is already adhered needs to be detached, and be adhered again. Therefore, the number of steps increases. On this account, it is impossible to provide an inexpensive optical integrated unit and an optical pickup apparatus using this optical integrated unit.

Further, used as another method for eliminating the length error of the light path is a method for inserting the spacer between the light receiving unit and the support substrate. However, in this method, the spacer cannot be adjusted so as to have a thickness less than its minimum thickness. Therefore, it is impossible to carry out an accurate adjustment. On this account, it is impossible to provide a reliable optical integrated unit and an optical pickup apparatus using this optical integrated unit.

SUMMARY OF THE INVENTION

The present invention was made to solve the above-described conventional problems, and an object of the present invention is to realize a highly-reliable optical integrated unit and an optical pickup apparatus including this optical integrated unit.

In order to solve the above-described problem, an optical integrated unit of the present invention includes: a light guiding section for guiding a light beam, emitted from a light source and reflected by a recording medium, to a light receiving element; and a support substrate, provided between the light source and the light guiding section, for fixing the light source and the light guiding section, the light guiding section having a contact surface which faces the light source, the support substrate having a surface which contacts the contact surface and has a depressed region, the light source being adhered to the support substrate so as to face a substrate adhering region of the contact surface of the light guiding section, the substrate adhering region not facing the depressed region, and the light receiving element being directly adhered to a light receiving unit adhering region of the contact surface of the light guiding section, the light receiving unit adhering region facing the depressed region.

According to the above-described configuration of the present invention, the light guiding section and the light receiving element are adhered to each other without the support substrate.

Unlike conventional examples, the light guiding section and the light receiving element are adhered to each other without the support substrate. Therefore, the thickness error of the support substrate and the thickness error of the relay substrate provided between the light receiving element and the support substrate do not cause the length error of the light path. Therefore, it is possible to adjust the light receiving element highly accurately. Thus, it is possible to provide a reliable optical integrated unit and an optical pickup apparatus using this optical integrated unit.

Since the thickness errors of the substrates do not cause the length error of the light path, it is not necessary to use a method for causing the semiconductor laser to move in the light axis direction so as to cancel the thickness error in the light axis direction. Therefore, it is unnecessary to carry out a step of detaching the semiconductor laser which is already adhered and a step of attaching the semiconductor laser again. Thus, it is possible to provide an inexpensive optical integrated unit and an optical pickup apparatus using this optical integrated unit.

Moreover, since the thickness errors of the substrates do not cause the length error of the light path, it is not necessary to use, as a method for canceling the length error of the light path, a method for inserting a spacer between the light receiving unit and the support substrate. Therefore, it is possible to avoid a problem of this method, that is, such a problem that fine adjustment cannot be carried out.

Therefore, according to the optical integrated unit of the present invention, the thickness errors of the substrates do not cause the length error of the light path. Thus, it is possible to realize a highly-reliable optical integrated unit.

Moreover, in addition to the above-described configuration of the present invention, the optical integrated unit of the present invention is configured such that the light receiving unit adhering region and the substrate adhering region are obtained by dividing the contact surface by a border line and a straight line crossing the contact surface, and the light receiving unit adhering region is not located at an edge of the contact surface.

According to the above-described configuration of the present invention, the light receiving unit adhering region and the substrate adhering region are obtained by dividing the contact surface by the border line and the straight line crossing the contact surface, and the light receiving unit adhering region is not located at an edge of the contact surface.

According to the above-described configuration of the present invention, only at the light receiving unit adhering region, the light guiding section and the light receiving unit are directly adhered to each other without the support substrate. Regarding a surface, contacting the support substrate, of the light guiding section, the light receiving unit adhering region and the substrate adhering region are obtained by dividing the contact surface by the border line and the straight line crossing the contact surface, and the light receiving unit adhering region is not located at an edge of the contact surface.

If the light receiving unit adhering region is located at an edge of the contact surface due to a single straight line, the light guiding section inclines downwardly by the straight line as a supporting line.

However, if the contact surface is divided by a border line(s) so that the light receiving unit adhering region is not located at an edge of the contact surface, the light guiding section does not incline.

For example, as shown in FIGS. 10(a) and 10(b), the contact region is divided into three regions (A, B, and A) by two straight lines (L1 and L2) that are border lines, the region (B) between two straight lines is a light receiving unit adhering region, and the regions (A and A) are substrate adhering regions.

Alternatively, for example, as shown in FIG. 10(c), the region is divided into two regions (A and B) by a polygonal straight line (L) that is a border line, the region (B) inside the polygonal straight line (L) is the light receiving unit adhering region, and the region (A) outside the polygonal straight line (L) is the substrate adhering region.

In this way, in addition to the effect by the above-described configuration of the present invention, the adhesive strength between the light guiding section and the support substrate can be assured.

Moreover, in addition to the above-described configuration of the present invention, the optical integrated unit of the present invention is configured such that: the light guiding section includes at least three prisms that are a first prism, a second prism, and a third prism which are adhered to each other in this order; a surface between the first prism and the second prism allows outgoing light to pass through so that the outgoing light travels from the light source to the recording medium, and which reflects returning light so that the returning light travels from the recording medium to the light receiving element; a surface between the second prism and the third prism reflects the returning light from the surface between the first prism and the second prism so that the returning light travels from the recording medium to the light receiving element; and the first prism on one end of the light guiding section has a surface facing the light source, a last prism on another end of the light guiding section has a surface facing the light source, and these surfaces are on a same plane.

According to the above-described configuration of the present invention, the first prism and the third (last) prism can be adhered to one surface of the support substrate, the light dividing section does not incline with respect to a contacting surface, and can be adhered to the support substrate highly accurately. Therefore, in addition to the effects by the above-described configuration of the present invention, it is possible to provide a further reliable optical integrated unit and an optical pickup apparatus using this optical integrated unit.

Moreover, in addition to the above-described configuration of the present invention, the optical integrated unit of the present invention is configured such that an adhesive strength of an adhesive agent applied to a prism through which the outgoing light first passes is lower than that of an adhesive agent applied to another prism.

According to the above-described configuration of the present invention, the adhesive strength of the adhesive agent applied to the prism through which the outgoing light first passes is lower than that of the adhesive agent applied to another prism.

Therefore, in addition to the effects by the above-described configuration of the present invention, the stress is released toward the prism to which the adhesive agent whose adhesive strength is lower is applied. With this, it is possible to avoid the distortion.

Moreover, in addition to the above-described configuration of the present invention, the optical integrated unit of the present invention is configured such that the light receiving element has, on a surface thereof, a wiring through which an output signal of the light receiving element passes, the surface being opposite a surface to which the light guiding section is adhered.

According to the above-described configuration of the present invention, the wiring through which the output signal of the light receiving element passes is provided on the surface of the light receiving element, the surface being opposite the surface to which the light guiding section is adhered. Therefore, in addition to the effects by the above-described configuration of the present invention, the light receiving element and the prism can be adjusted separately, and this adjustment with respect to the displacement can be carried out drastically. Further, electrically poor connection hardly occurs.

Moreover, in addition to the above-described configuration of the present invention, the optical integrated unit of the present invention is configured such that an adhesive strength of an adhesive agent applied to a region, on the light guiding section, through which the outgoing light first passes is lower than that of an adhesive agent applied to a region, on the light guiding section, to which the light receiving element is adhered.

According to the above-described configuration of the present invention, the adhesive strength of the adhesive agent applied to the region, on the light guiding section, through which the outgoing light first passes is lower than that of the adhesive agent applied to the region, on the light guiding section, to which the light receiving element is adhered. Therefore, in addition to the effects by the above-described configuration of the present invention, the stress is released toward the region to which the adhesive agent whose adhesive strength is lower is applied. With this, it is possible to avoid the distortion.

Moreover, in addition to the above-described configuration of the present invention, the optical integrated unit of the present invention is configured such that an adhesive strength of an adhesive agent applied to a region, on the light guiding section, through which the outgoing light passes is lower than that of an adhesive agent applied to a region, on the light guiding section, where a wiring through which an output signal of the light receiving element passes is adhered to the support substrate.

According to the above-described configuration of the present invention, the adhesive strength of the adhesive agent applied to the region, on the light guiding section, through which the outgoing light first passes is lower than that of the adhesive agent applied to the region, on the light guiding section, where the wiring through which an output signal of the light receiving element passes is adhered to the support substrate. Therefore, in addition to the effects by the above-described configuration of the present invention, the stress is released toward the region to which the adhesive agent whose adhesive strength is lower is applied. With this, it is possible to avoid the distortion.

Moreover, in addition to the above-described configuration of the present invention, the optical integrated unit of the present invention is configured such that the support substrate includes a first support substrate for supporting the light source and a second support substrate for supporting the light guiding section.

According to the above-described configuration of the present invention, the support substrate includes the first support substrate for supporting the light source and the second support substrate for supporting the light guiding section. Therefore, in addition to the effects by the above-described configuration of the present invention, the position adjustment of the light source and the position adjustment of the light dividing section can be carried out separately. With this, it is possible to provide a further reliable optical integrated unit and an optical pickup apparatus using this optical integrated unit.

Moreover, in addition to the above-described configuration of the present invention, the optical integrated unit of the present invention further includes a polarization diffraction element on a surface of the light guiding section, the surface being opposite a surface facing the light source.

According to the above-described configuration of the present invention, the polarization diffraction element is provided on the surface of the light guiding section, the surface opposite the surface facing the light source. Therefore, in addition to the effects by the above-described configuration of the present invention, it is possible to miniaturize the optical integrated unit.

Moreover, in addition to the above-described configuration of the present invention, the optical integrated unit of the present invention is configured such that the polarization diffraction element includes one or both of a polarization diffraction element for generating three beams and a polarization diffraction element for generating a control signal.

According to the above-described configuration of the present invention, the polarization diffraction element includes one or both of the polarization diffraction element for generating three beams and the polarization diffraction element for generating the control signal. Therefore, in addition to the effects by the above-described configuration of the present invention, it is possible to generate the control signal. With this, it is possible to provide a further reliable optical integrated unit and an optical pickup apparatus using this optical integrated unit.

Moreover, an optical pickup apparatus of the present invention includes an optical integrated unit having: a light guiding section for guiding a light beam, emitted from a light source and reflected by a recording medium, to a light receiving element; and a support substrate, provided between the light source and the light guiding section, for fixing the light source and the light guiding section, the light guiding section having a contact surface which faces the light source, the support substrate having a surface which contacts the contact surface and has a depressed region, the light source being adhered to the support substrate so as to face a substrate adhering region of the contact surface of the light guiding section, the substrate adhering region not facing the depressed region, and the light receiving element being directly adhered to a light receiving unit adhering region of the contact surface of the light guiding section, the light receiving unit adhering region facing the depressed region.

According to the above-described configuration of the present invention, the optical pickup apparatus includes any one of the above-described optical integrated units. Therefore, the thickness errors of the substrates do not cause the length error of the light path. On this account, it is possible to realize a highly-reliable optical pickup apparatus.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8 is a cross-sectional view showing the schematic configuration of an optical integrated unit.

FIG. 9 is a cross-sectional view showing the schematic configuration of an optical integrated unit.

DESCRIPTION OF THE EMBODIMENTS

The following will explain one embodiment of the present invention. Note that the present embodiment will explain an example in which an optical integrated unit of the present invention is used in an optical pickup apparatus included in an optical recording-reproduction apparatus which optically records information to and reproduces information from an optical disc that is an optical recording medium.

First, the following configuration can be thought of as a comparative example with respect to the above-described conventional configuration. In the above-described conventional example, since the light dividing section and the light receiving element are adhered to each other via the support substrate, the thickness error of the support substrate and the thickness error of the relay substrate provided between the light receiving element and the support substrate cause the length error of the light path. Therefore, it is impossible to adjust the light receiving element highly accurately. Further, since the length error of the light path causes the loss of signal, it is impossible to provide a reliable optical integrated unit and an optical pickup apparatus using this optical integrated unit.

Figure 11:
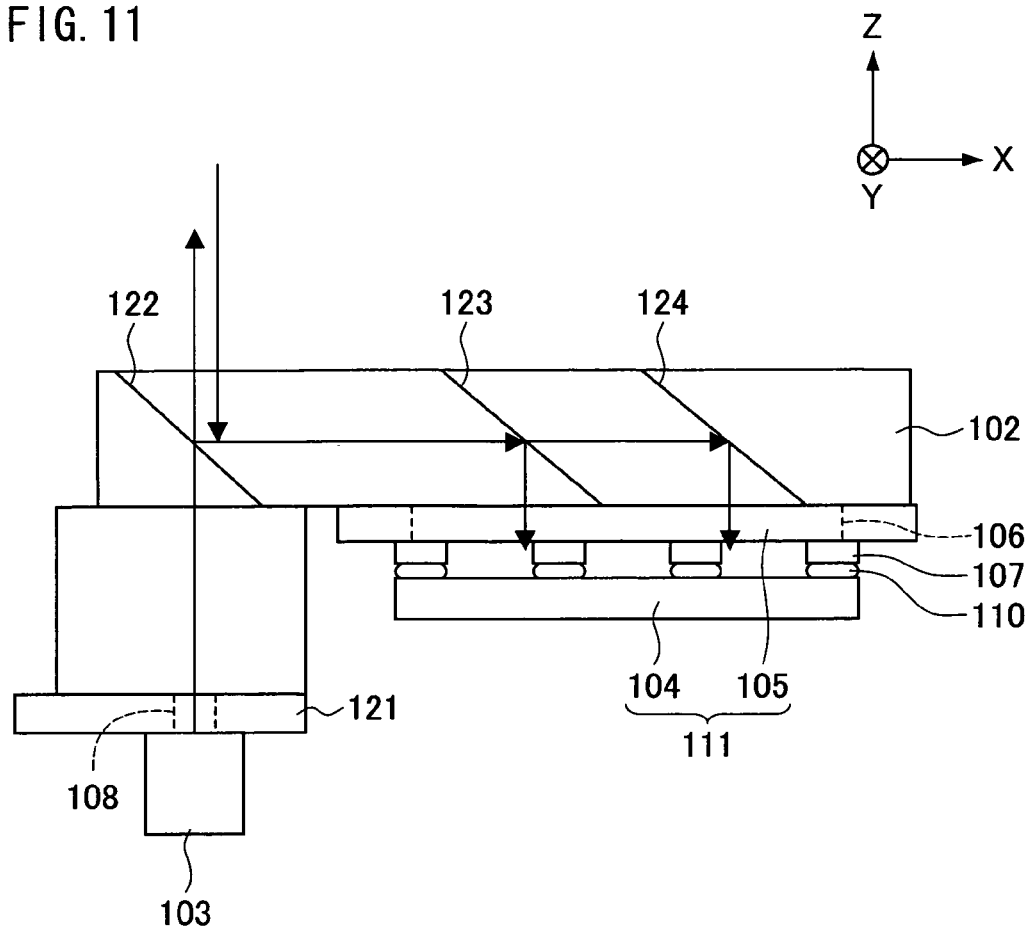
FIG. 11 is a cross-sectional view showing the configuration of an optical integrated unit to be compared with an optical integrated unit of the present invention.
Figure 12:
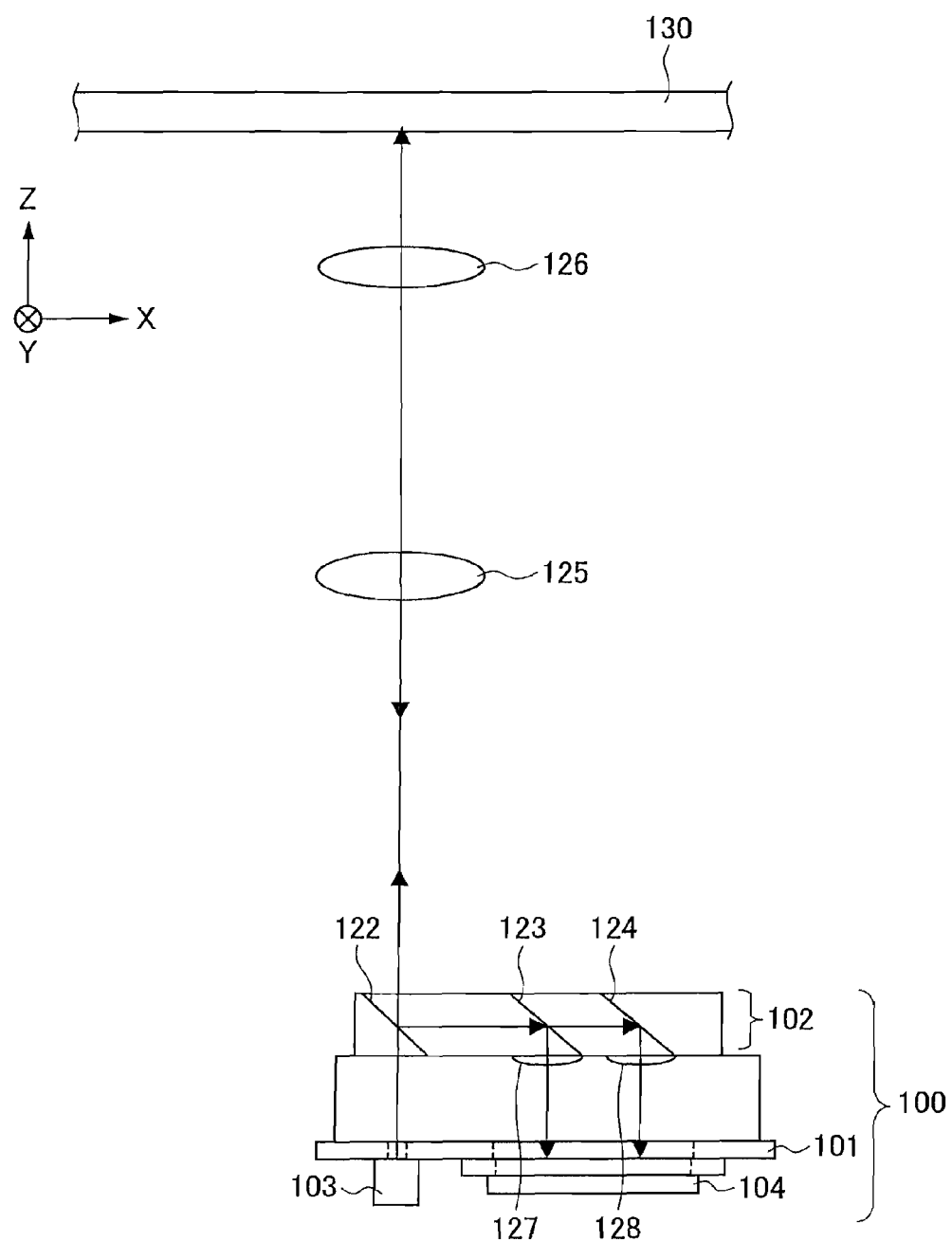
FIG. 12 is a cross-sectional view showing the schematic configuration of a conventional optical pickup apparatus.
Figure 13:
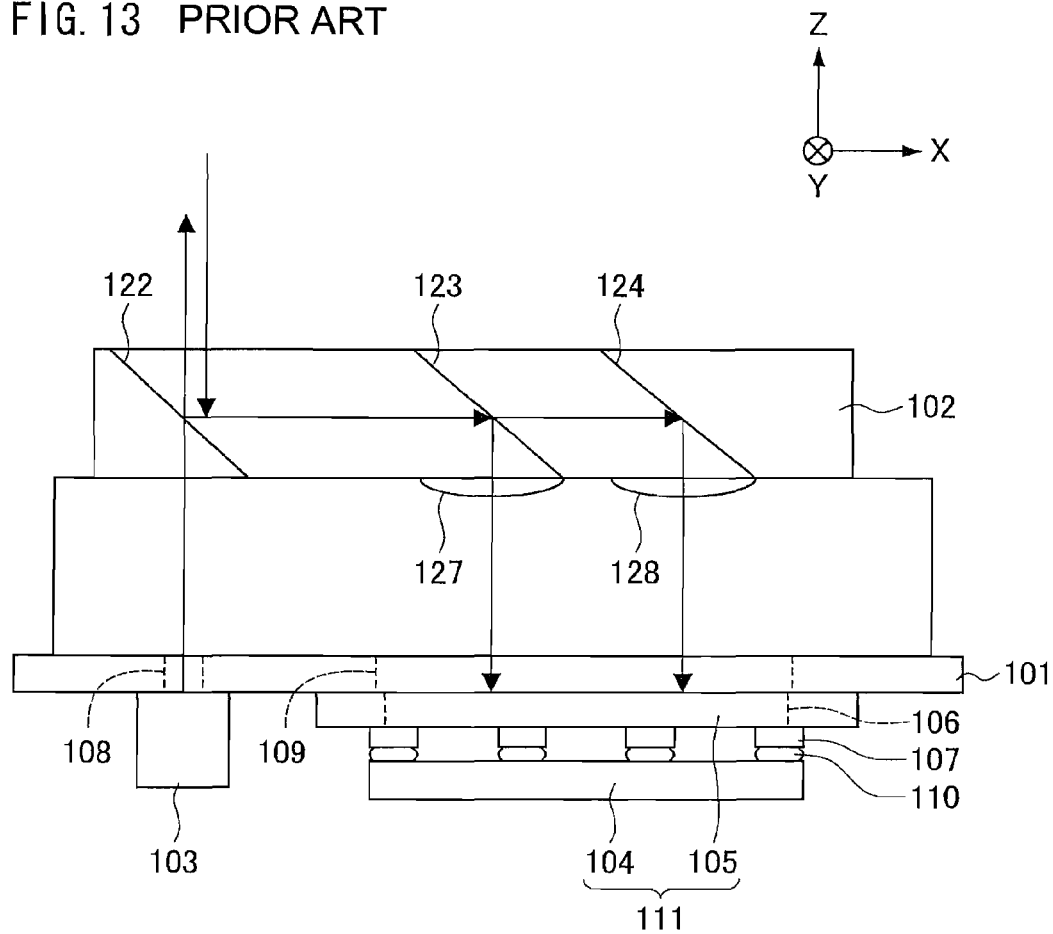
FIG. 13 is a cross-sectional view showing the configuration of an optical integrated unit of the conventional optical pickup apparatus.
Figure 14:
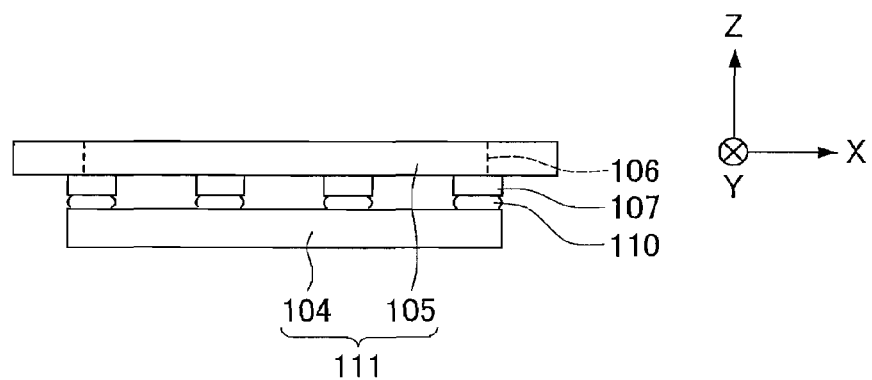
FIG. 14 is a cross-sectional view showing the configuration of a conventional light receiving unit.
Figure 15:
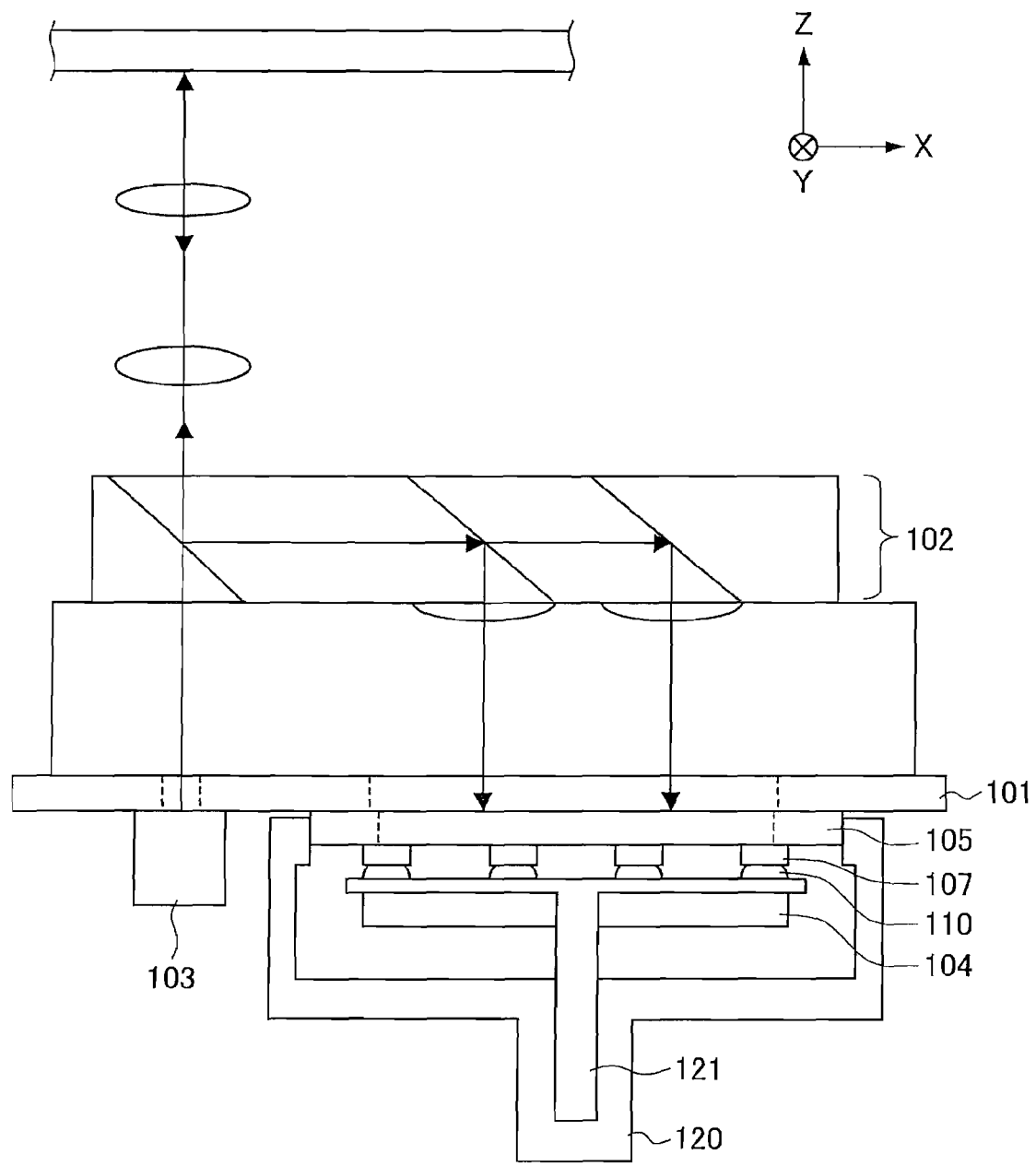
FIG. 15 is a cross-sectional view for explaining a method for adjusting a conventional optical integrated unit.
Figure 16:
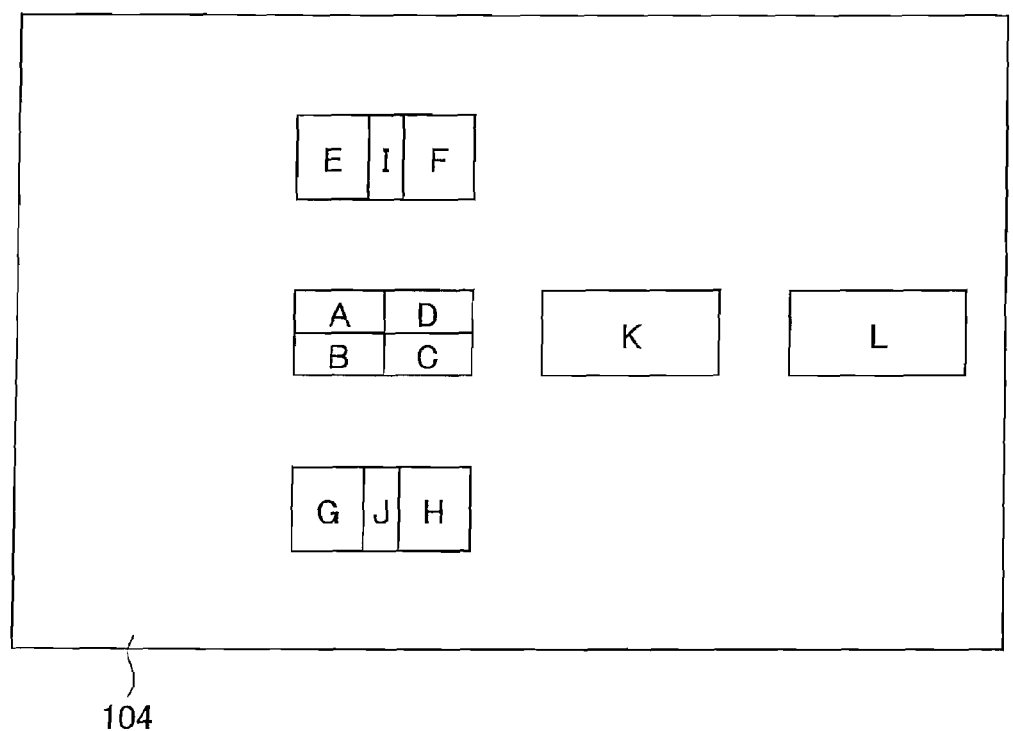
FIG. 16 is a top view showing the configuration of a conventional light receiving element.

FIG. 11 shows the configuration of an optical integrated unit which can solve this problem. According to this configuration, the light dividing section 102 and the light receiving unit 111 are adhered to each other without the support substrate. Therefore, it is possible to eliminate an influence on the length of the light path by the thickness error of the support substrate.

However, in this configuration, only one side of the light dividing section 102 is adhered to the support substrate 121. Therefore, it is impossible to assure the adhesive strength between the light dividing section 102 and the support substrate 121. That is, it is impossible to provide an optical integrated unit and optical pickup apparatus each of which has high vibration resistance and high impact resistance.

Next, the following will describe the configuration of the present embodiment.

Conventionally, since the light dividing section and the light receiving element are adhered to each other via the support substrate, the thickness error of the support substrate and the thickness error of the relay substrate provided between the light receiving element and the support substrate cause the length error of the light path. Therefore, it is impossible to adjust the light receiving element highly accurately. It is necessary to solve this problem, and further, it is necessary to assure the adhesive strength between the light dividing section and the support substrate.

In the present embodiment, an optical integrated unit includes: a light source; at least one light receiving element; a light dividing section which divides outgoing light from the light source and returning light from optical disc, and reflects the returning light so as to guide it to the light receiving element; and a support substrate, and the support substrate is concave, the light dividing section includes at least three prisms, the prisms on both sides of the light dividing section are respectively adhered to two protrusions of the concave support substrate, and the light receiving element is adhered to the light dividing section via a cover glass.

Here, the cover glass is used as a member between the light dividing section and the light receiving element. However, other than the cover glass, it is possible to use a member whose linear expansion coefficient is similar to that of the light dividing section.

Figure 1:
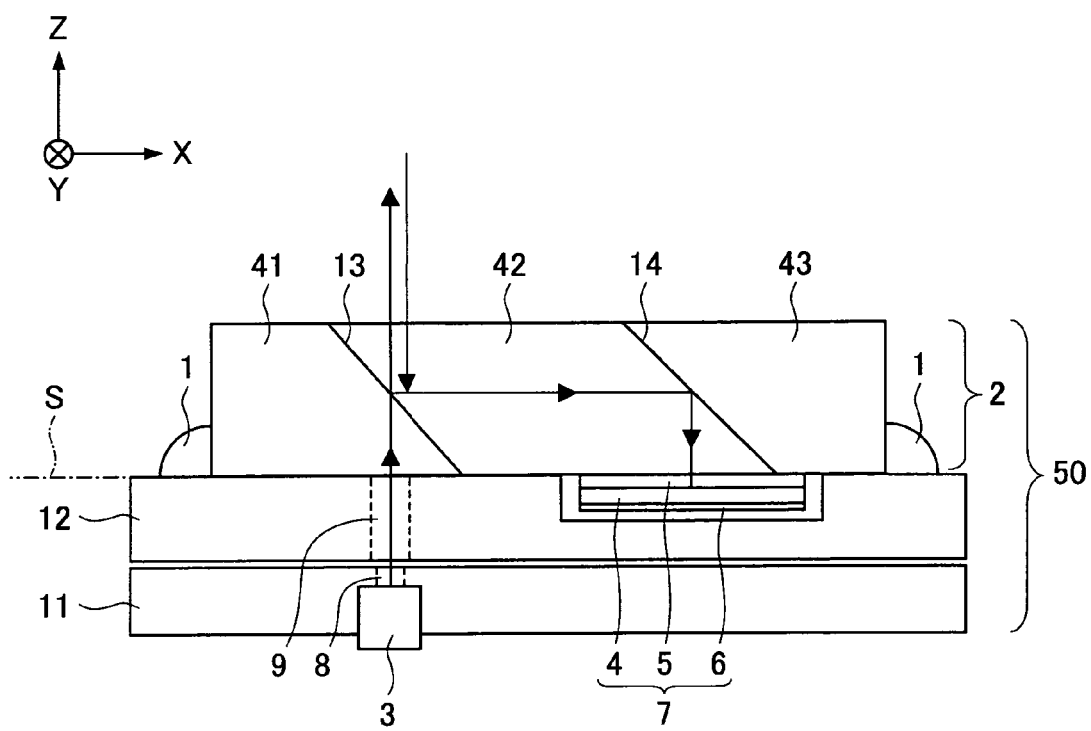
FIG. 1 is a cross-sectional view showing the configuration of an optical integrated unit used in an optical pickup apparatus of the present invention.

As shown in FIG. 1, an optical integrated unit 50 of the present embodiment includes a first support substrate 11, a second support substrate 12, a light dividing section (light guiding section) 2, a semiconductor laser 3 that is a light source, a light receiving element 4, and a cover glass 5 provided between the light receiving element 4 and the light dividing section 2. Note that a flexible printed circuit (FPC, will be described later) extends in a Y direction but is not shown.

The first support substrate 11 supports the semiconductor laser, and the second support substrate 12 supports the light dividing section 2. Moreover, one surface of the first support substrate 11 is in contact with one surface of the second support substrate 12.

With this configuration, it is possible to carry out the position adjustment of the light source and the position adjustment of the light dividing section separately. Therefore, it is possible to provide a reliable optical integrated unit and an optical pickup apparatus using this optical integrated unit. The method for the position adjustment will be described later.

The light dividing section 2 is attached to one surface of the second support substrate 12, and includes a plurality of prisms. These prisms are a first prism 41 into which an emitted light beam from the semiconductor laser first enters, a second prism 42 through which a returning light beam from the optical disc 30 mainly propagates, and a third prism 43 through which the light beam does not propagate. Moreover, the present invention needs the third prism 43 so that the optical integrated unit 50 has high vibration resistance and high impact resistance. The reason for this will be described later. Moreover, the propagation of the light beam will also be described later. A contact surface between the first prism 41 and the second prism is a first surface 13, and a contact surface between the second prism 42 and the third prism 43 is a second surface 14. The semiconductor laser 3 is provided on one surface of the first support substrate 11. The light receiving element 4 and the cover glass 5 are adhered to one surface of the light dividing section 2, the surface facing the light source. In the following description, for adhesion, the present invention uses an ultraviolet curing adhesive agent (UV adhesive agent).

The first support substrate 11 has a first opening 8 for allowing a light beam, emitted from the semiconductor laser 3, to travel to the second support substrate 12. The second support substrate 12 has a second opening 9 for allowing the light beam, having passed through the first opening 8, to reach the light dividing section 2. Moreover, the second support substrate 12 is concave, and includes the light receiving element 4 in its rectangle portion (depressed region) at the center of the concave second support substrate 12. Further, the second support substrate 12 is adhered to the light dividing section 2 by using two protrusions and adhesives 1.

Figure 2:
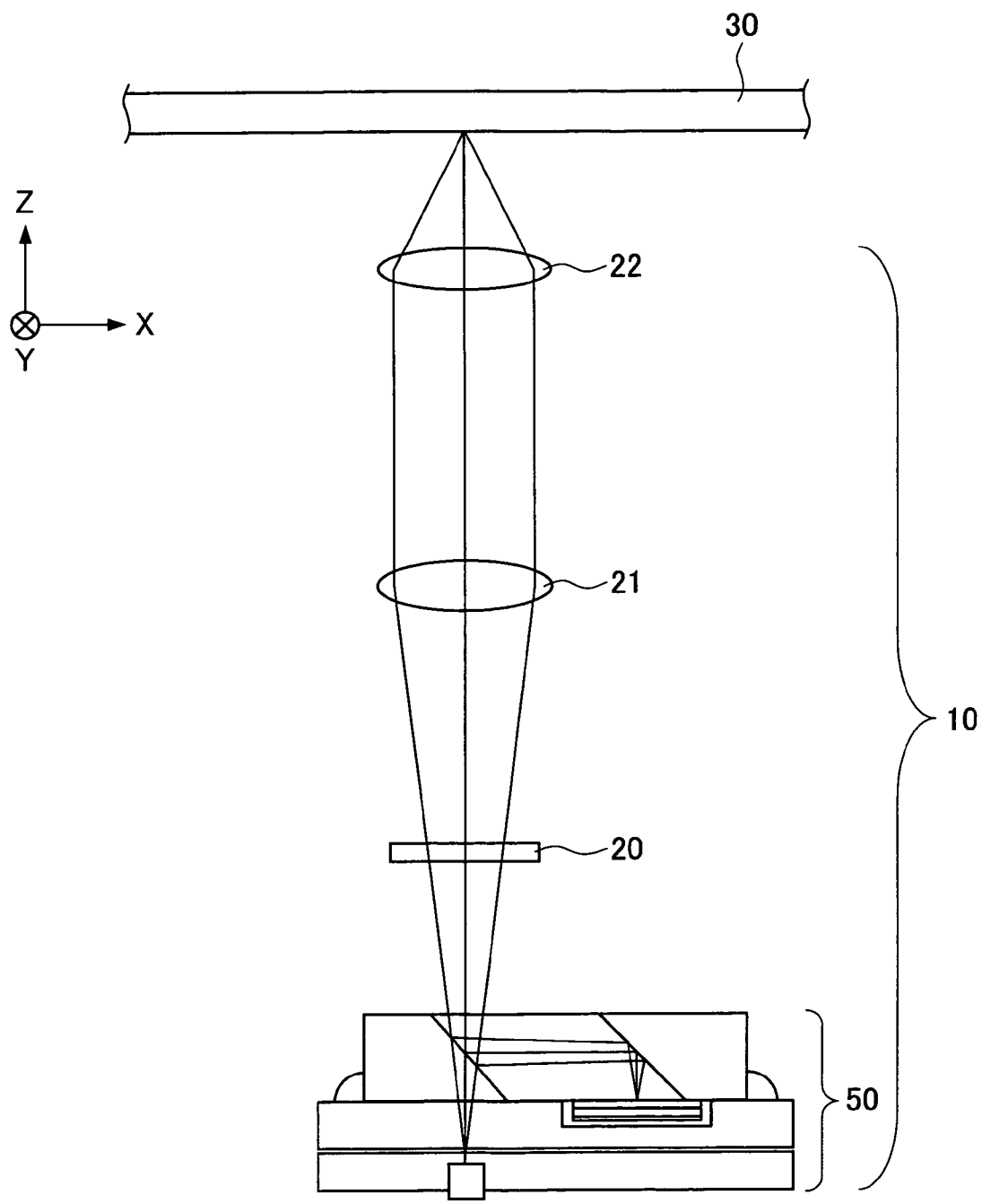
FIG. 2 is a cross-sectional view showing the schematic configuration of an optical pickup apparatus including the optical integrated unit shown in FIG. 1.

Referring to FIGS. 1 and 2, the following will explain an example in which the optical integrated unit is used in the optical pickup apparatus. The light beam emitted from the semiconductor laser 3 passes through the first opening 8 of the first support substrate 11 and the second opening 9 of the second support substrate, and passes through the first surface 13 of the light dividing section 2 without change. The light beam passes through a polarization diffraction element 20 and is diffracted to three beams that are a 0 order light, +1st order light, and −1st order light. These three beams are then converted into parallel light by a collimator lens 21, and enter into an objective lens 22. The light beam focuses on the optical disc 30 by the objective lens 22, and is reflected by the optical disc 30. The light beam that is the returning light passes through the objective lens 22 and the collimator lens 21, and enters into the polarization diffraction element 20.

Here, the light beam is diffracted to a light beam for a control signal, and then enters into the light dividing section 2. The light beam is totally reflected by the first surface 13, and changes its traveling direction to an X direction. Further, the light beam is reflected by the second surface 14, passes through the cover glass 5, and focuses on the light receiving element 4.

Here, the polarization diffraction element 20 includes a first diffraction grating which converts an outgoing light beam into three beams for track control, and a second diffraction grating which converts the returning light beam into the light beam for a focus control signal.

Moreover, the polarization diffraction element 20 may include only one of the first diffraction grating and the second diffraction grating.

Next, the following will explain a method for assembling the optical integrated unit 50. The light receiving element 4 is attached to the cover glass 5 in advance. Further, a small amount of UV adhesive agent is supplied around the light receiving element 4 and the cover glass 5, and is cured. This assures the physical adhesive strength between the light receiving element 4 and the cover glass 5. Further, a wiring is provided on one surface of the light receiving element 4 (this surface is opposite the surface to which the cover glass is attached), and the light receiving element 4 is connected with a signal processing system (not shown) via FPC 6. In the following description, the light receiving element 4, the cover glass 5, and FPC 6 are termed a light receiving unit 7 as an integral unit.

Next, the light receiving unit 7 and the light dividing section 2 are adhered to each other. Here, the position adjustment and adhesion are carried out while the cover glass of the light receiving unit 7 being in contact with the second prism of the light dividing section. The adhesion is carried out by supplying the UV adhesive agent around the surface where the cover glass and the light dividing section contacts each other.

Since the wiring is provided on one surface of the light receiving element 4, the surface being opposite the surface to which the cover glass 5 is attached, (i) the optical integrated unit does not require a relay substrate, having the wiring, on the surface to which the cover glass is attached, and (ii) the optical integrated unit does not require a support substrate between the light receiving unit 7 and the light dividing section 2. Therefore, the light receiving element 4 is adhered to the light dividing section 2 via only the cover glass 5. On this account, the optical integrated unit is not affected by the thickness error of the relay substrate and the support substrate. In addition, the position adjustment and adhesion of the light receiving element can be carried out with an insignificant length error of the light path. Thus, it is possible to provide an inexpensive, reliable optical integrated unit which require few steps for adjustment, and an optical pickup apparatus using this optical integrated unit.

Figure 3A:
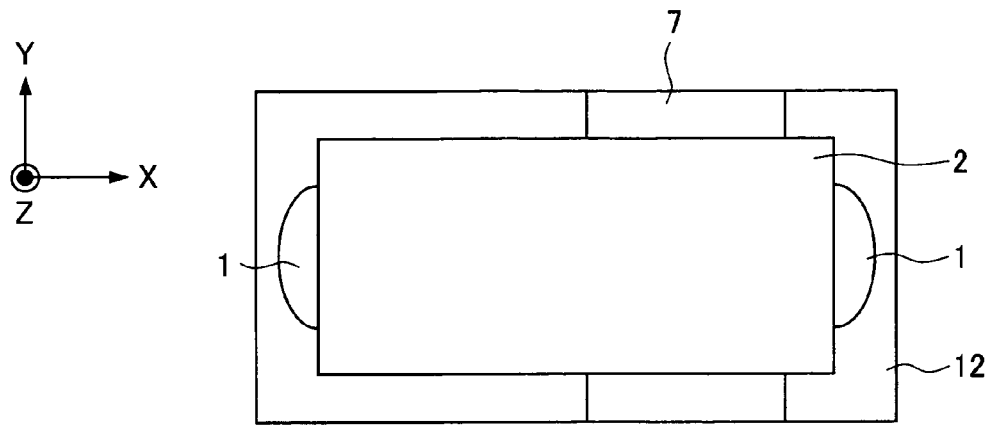
FIG. 3(a) is a top view of the optical integrated unit used in the optical pickup apparatus shown in FIG. 2, and is also a top view of the optical integrated unit shown in FIG. 3(b).
Figure 3B:
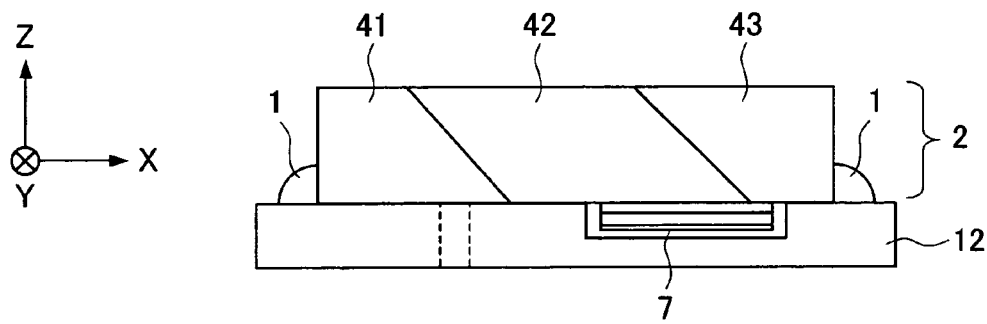
FIG. 3(b) is a cross-sectional view showing the schematic configuration of an optical integrated unit used in the optical pickup apparatus shown in FIG. 2.
Figure 3C:
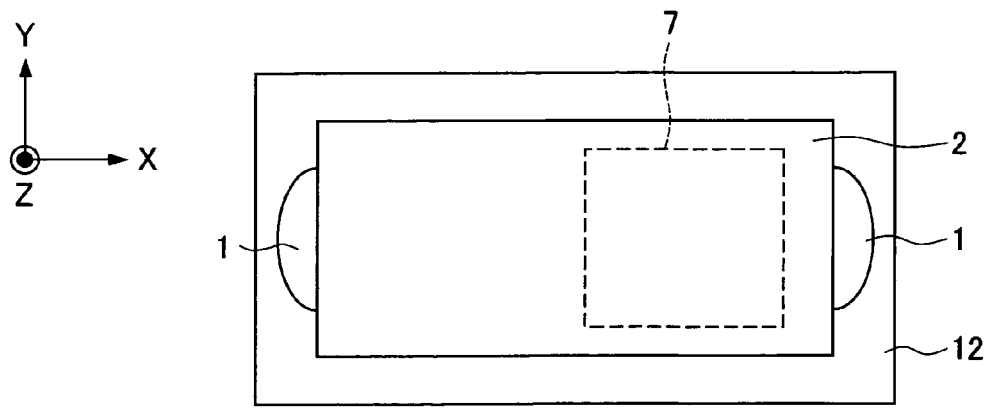
FIG. 3(c) is a top view of the optical integrated unit used in the optical pickup apparatus shown in FIG. 2, and is also a top view of the optical integrated unit shown in FIG. 3(b).

Next, the light dividing section 2 is adhered to the light receiving unit 7 and the second support substrate. FIGS. 3(*a*) to 3(*c*) are diagrams for explaining a method for adhering the light dividing section 2 to the light receiving unit 7 and the second support substrate. FIG. 3(*a*) is a diagram when viewed from an emitted light axis direction (Z direction) that is a direction of the light axis of the light emitted from the semiconductor laser, and FIG. 3(*b*) is a diagram when viewed from a direction perpendicular to the emitted light axis direction. The second support substrate 12 is concave when viewed from the Y direction, and the light receiving unit 7 is provided in the rectangle portion. Moreover, two protrusions of the concave second support substrate 12 are in contact with the first prism 41 and the third prism 43 of the light dividing section 2, respectively. As shown in FIGS. 3(*a*) to 3(*c*), the first prism 41 and the second support substrate 12 are adhered to each other, and the second prism 43 and the second support substrate 12 are adhered to each other. Thus, the adhesion between the light dividing section 2 and the support substrate 12 is carried out at two places. In this way, it is possible to provide a reliable optical integrated unit and optical pickup apparatus each having high vibration resistance and high impact resistance.

Moreover, as shown in FIG. 3(*c*), the length in the Y direction of the light receiving unit 7 may be shorter than the length in the Y direction of the light dividing section 2.

The following will describe this case in more detail in reference to FIGS. 10(*a*) to 10(*d*). Note that FIGS. 10(*a*) to 10(*d*) use the same space coordinates as FIG. 3(*a*).

For example, as shown in FIG. 10(*a*), the configuration of FIG. 3(*a*) is such that, when the surface, facing the light source, of the light dividing section is termed a contact surface, (i) the contact surface is divided into three regions (A, B, and A) by two straight lines (L1 and L2) as border lines, (ii) the region (B) between the straight lines is termed a light receiving unit adhering region, and (iii) each region (A, and A) is termed a substrate adhering region.

The light source is adhered to the light dividing section 2 via the support substrates 11 and 12, that is, the light source is adhered to a region so as not to face the depressed region. This region is the substrate adhering region. Moreover, the light receiving element is adhered to the light dividing section 2 without the support substrates 11 and 12, that is, the light receiving element 4 is adhered to a region so as to face the depressed region. This region is the light receiving unit adhering region. A is the substrate adhering region, and B is the light receiving unit adhering region.

As shown in FIG. 10(*b*), the length ("a") in the X direction of the region A may be equal to the length ("c") in the X direction of another region A. This brings a better balance.

Moreover, for example, as shown in FIG. 10(*c*), the contact surface is divided into two regions (A and B) by a polygonal straight line (L) as a border line. The region (B) inside the polygonal straight line (L) is the light receiving unit adhering region, and the region (A) outside the polygonal straight line (L) is the substrate adhering region.

In the case of dividing the contact surface by the border line L of FIG. 10(*c*) or by the border lines L1 and L2, the substrate adhering region(s) is located on both sides (at both edges) of the contact surface. However, if the contact surface is divided by the border line L of FIG. 10(*d*), the substrate adhering region is located on only one side (at only one edge) of the contact surface. In such a case, the light dividing section (light guiding section) 2 inclines downwardly by the border line as a supporting line. However, since the substrate adhering region(s) is located on both sides of the contact surface in the above-described configuration of the present invention, the light guiding section does not incline.

Note that the border line does not have to be the straight line or the polygonal straight line. For example, the border line may be a curved line.

FIG. 10 (*d*) shows a comparative example including such a border line. It is apparent that a border line L dividing the region into regions A and B is such a border line.

Figure 4A:
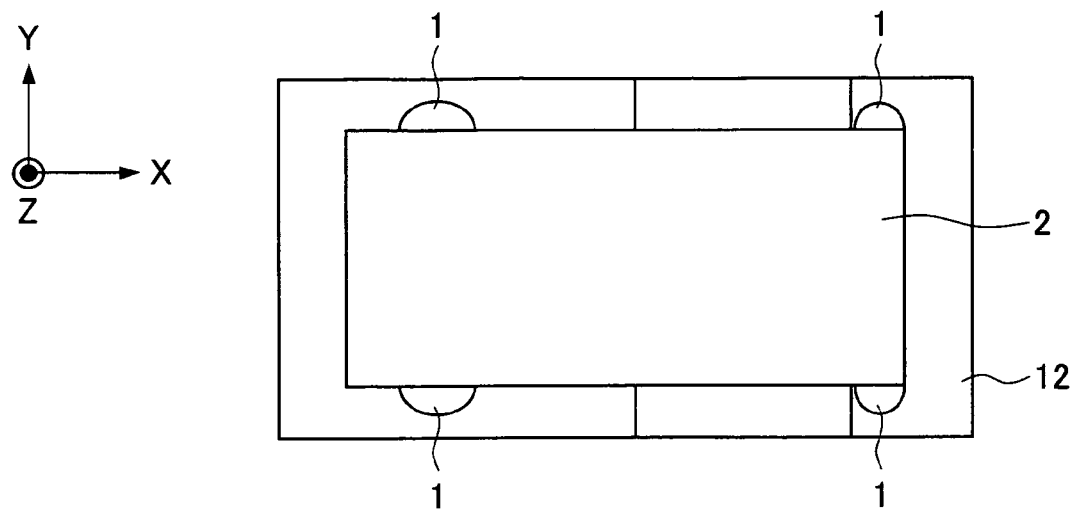
FIG. 4(a) is a top view of an optical integrated unit used in the optical pickup apparatus shown in FIG. 2, and is also a top view of the optical integrated unit shown in FIG. 4(b).
Figure 4B:
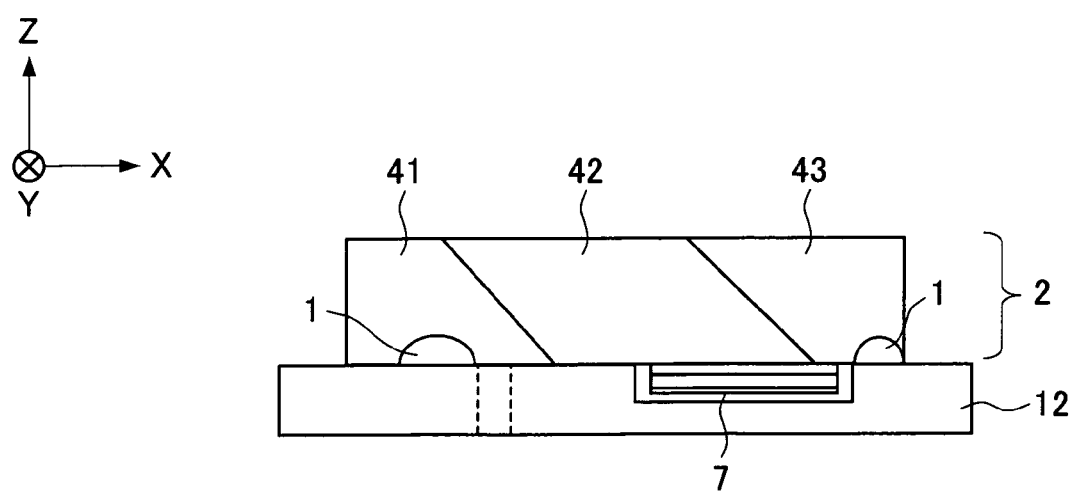
FIG. 4(b) is a cross-sectional view showing the schematic configuration of the optical integrated unit used in the optical pickup apparatus shown in FIG. 2.

Further, as shown in FIGS. 4(*a*) and 4(*b*), the first prism 41 and the second support substrate 12 may be adhered to each other at two places, and the second prism 43 and the second support substrate 12 may be adhered to each other at two places. Thus, the light guiding section 2 and the second support substrate 12 may be adhered to each other at four places. FIG. 4(*a*) is a diagram when viewed from the emitted light axis direction (Z direction), and FIG. 4(b) is a diagram when viewed from a direction perpendicular to the emitted light axis direction. Moreover, the periphery of the first prism 41 may be adhered to the second support substrate 1.2, and the periphery of the second prism 43 may be adhered to the second support substrate 12.

Figure 5A:
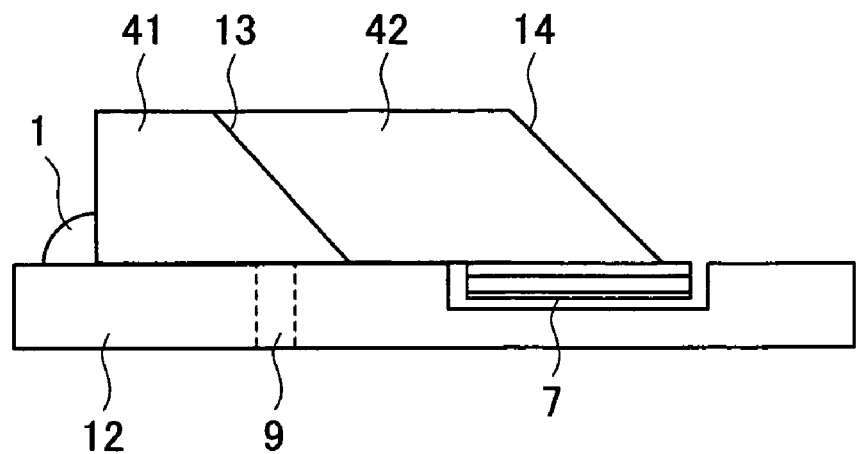
FIG. 5(a) is a cross-sectional view showing the schematic configuration of an optical integrated unit.
Figure 5B:
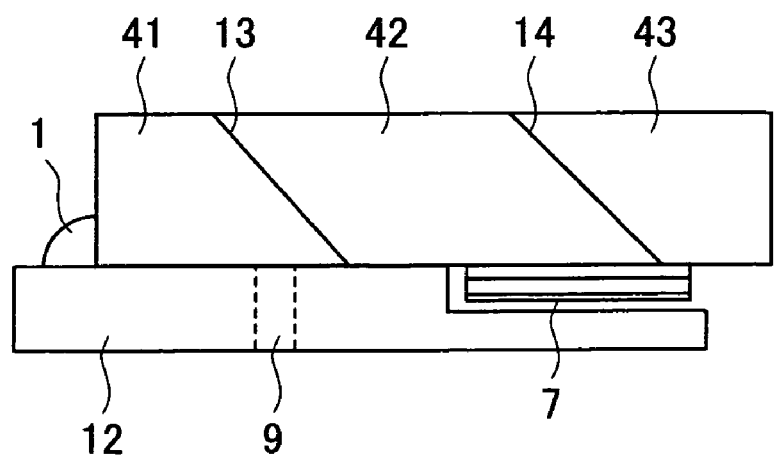
FIG. 5(b) is a cross-sectional view showing the schematic configuration of an optical integrated unit.

Here, the present invention requires the third prism 43. If the third prism 43 is not provided as shown in FIG. 5(a), only the first prism 41 is adhered to the second support substrate 12, that is, only one side of the light dividing section 2 is adhered to the second support substrate 12. In this case, the adhesive strength between the light dividing section 2 and the second support substrate 12 is low, and high vibration resistance and high impact resistance cannot be obtained. Further, even if the third prism 43 is provided, but does not contact the second support substrate as shown in FIG. 5(b), only the first prism 41 is adhered to the second support substrate 12. Here again, the adhesive strength between the light dividing section 2 and the second support substrate 12 is low, and high vibration resistance and high impact resistance cannot be obtained.

Further, a surface, contacting the second support substrate 12, of the first prism 41 and a surface, contacting the second support substrate 12, of the third prism 43 are on the same plane (indicated by "S" in FIG. 1). On this account, the first prism 41 and the third prism 43 can be adhered to one surface of the second support substrate 12. Thus, the light dividing section 2 does not incline with respect to a contacting surface, and can be adhered to the second support substrate highly accurately. Therefore, it is possible to provide a reliable optical integrated unit and an optical pickup apparatus using this optical integrated unit.

Further, the adhesive agent for adhering the first prism 41 and the second support substrate 1.2 and the adhesive agent for adhering the third prism 43 and the second support substrate 12 are different in the adhesive strength from each other. The adhesive strength of the former is higher than that of the latter. The reason for this will be explained below.

First, a reference temperature is Temperature T used when the light dividing section 2 and the second support substrate 12 are adhered to each other. The temperature of the optical integrated unit 50 is not Temperature T due to various temperature changes. Here, the light dividing section 2 and the second support substrate 12 are different in the thermal expansion coefficient, and both sides of the light dividing section are adhered to the second support substrate 12. Therefore, the temperature change generates (i) a stress in a direction from adhesive portions at both sides of the light dividing section 2 toward the inside of the light dividing section, or (ii) a stress in a direction from adhesive portions at both sides of the light dividing section 2 toward the outside of the light dividing section. This stress causes the displacement or distortion of the light dividing section 2, resulting in the loss of signal reliability.

Here, the adhesive agents having different adhesive strengths are used between the first prism 41 and the second support substrate 12 and between the third prism 43 and the second support substrate 12. In this case, the stress is released toward the side where the adhesive agent having lower adhesive strength is used. Therefore, it is possible to avoid the distortion of the light dividing section 2. Further, in the case of using one adhesive agent for adhering the first prism 41 and the second support substrate 12 and another adhesive agent for adhering the third prism 43 and the second support substrate 12, the adhesive strength of the former is set to be higher than that of the latter. In this way, purposely, the displacement of the first prism 41 is not caused, but the displacement of the third prism 43 is caused. Here, the displacement of the third prism 43 is caused because, since the light beam does not propagate the third prism 43, the displacement of the third prism 43 does not affect the signal. However, since both the outgoing light beam and the returning light beam propagate the first prism 41, the displacement of the first prism 41 affects the signal. Thus, it is possible to provide a reliable, temperature-resistant optical integrated unit which has high vibration resistance and high impact resistance, and an optical pickup apparatus using this optical integrated unit.

Figure 6:
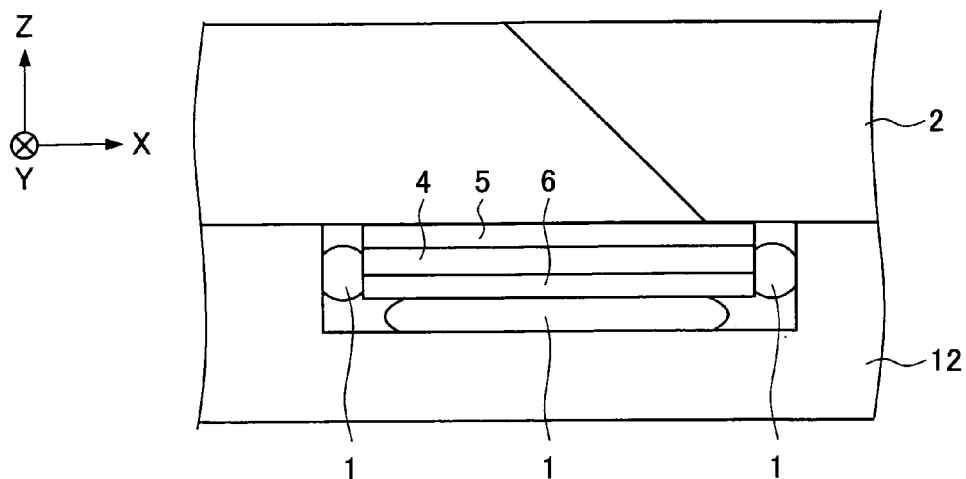
FIG. 6 is a cross-sectional view showing a portion where a light receiving unit and a support substrate are adhered to each other.

Next, as shown in FIG. 6, the light receiving element 4 and the second support substrate 12 are adhered to each other by the adhesives 1, and FPC 6 and the second support substrate 12 are adhered to each other by the adhesive 1. This enhances the adhesive strength between the light receiving element 4 and the second support substrate 12 and between FPC 6 and the second support substrate 12. By using the adhesive 1 whose adhesive strength is lower than that of the adhesive agent for adhering the first prism 41 and the second support substrate 12, the stress can be released. Thus, it is possible to provide a reliable, temperature-resistant optical integrated unit which has high vibration resistance and high impact resistance, and an optical pickup apparatus using this optical integrated unit.

Next, the first support substrate 11 and the semiconductor laser 3 are adhered to each other. With this adhesion, the first support substrate 11 and the semiconductor laser 3 are integrated. Moreover, as described above, the second support substrate 12, the light receiving unit 7, and the light dividing section 2 are integrated. On this account, the position adjustment of the first support substrate 11 and the position adjustment of the second support substrate 12 are carried out separately. Thus, it is possible to adjust an approach route from the semiconductor laser 3 to the optical disc 30, and a return route from the optical disc 30 to the light receiving element.

Specifically, the position adjustment of the first support substrate 11 and the second support substrate 12 are carried out by causing the semiconductor laser 3 to emit light and checking the output signal from the light receiving unit 7, and then the first support substrate 11 and the second support substrate 12 are adhered to each other.

Figure 7:
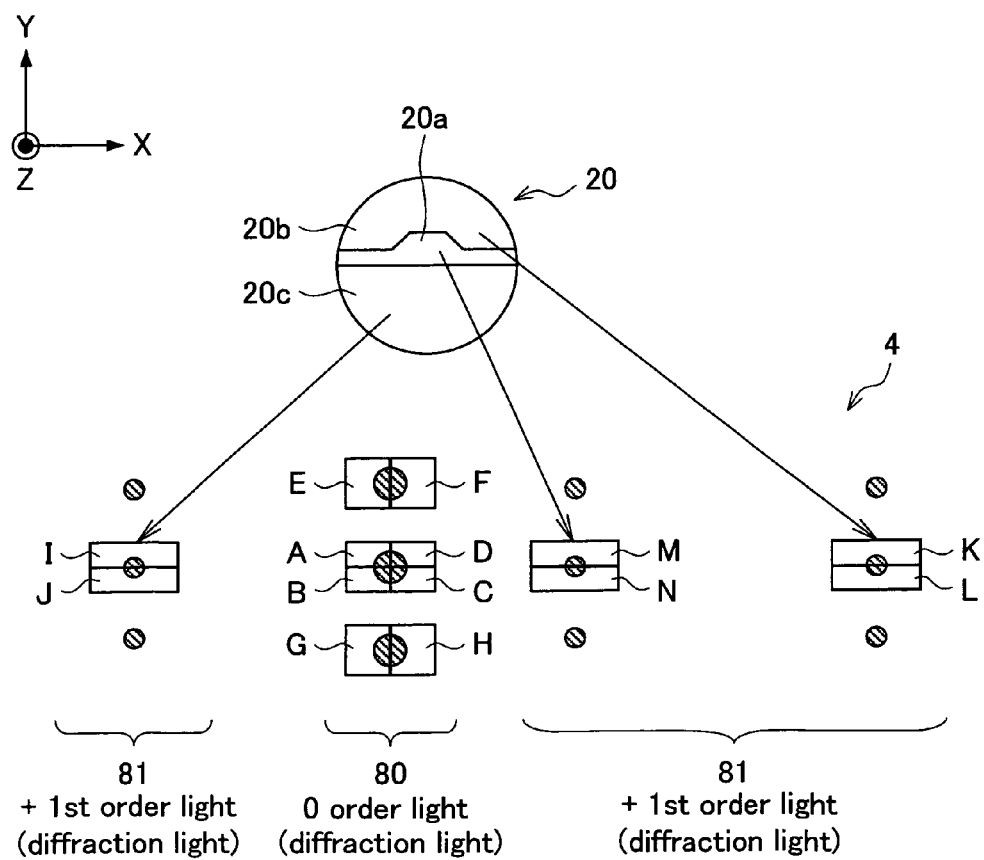
FIG. 7 is a top view showing the configuration of a light receiving element.

First, referring to FIG. 7, the following will explain a relationship between (i) a pattern of the second diffraction grating included in the polarization diffraction element 20 which diffracts the returning light and (ii) a light receiving portion of the light receiving element 4.

FIG. 7 shows the light beam on the light receiving element 4 when the light beam focuses on the optical disc 30 (not shown). Further, FIG. 7 shows a relationship between three regions 20a to 20c of the polarization diffraction element 20 and the traveling direction of the 1st order diffraction light. Practically, the central position of the polarization diffraction element 20 is placed at a position corresponding to the central position of the light receiving portions A, B, C, and D. However, for ease of explanation, the central position of the polarization diffraction element 20 is shifted in the Y direction.

The light receiving element 4 includes fourteen light receiving portions A to N. In an approach route optical system, three light beams generated by the first polarization diffraction element 20 is reflected by the optical disc 30, and in a return route optical system, the light is divided into non-diffraction light (0 order diffraction light) 80 and diffraction light (+1st order diffraction light) 81 by the polarization diffraction element 20. Moreover, the light receiving element 4 includes the light receiving portion for receiving, among these light beams, the light beam necessary for detecting the RF signal and/or a servo signal. Specifically, the polarization diffraction element 20 generates twelve beams that are three non-diffraction light (0 order diffraction light) 80 and nine +1st order diffraction light 81. Among them, the non-diffraction light (0 order diffraction light) 80 is designed to have a certain size so that the tracking error signal can be detected by Push-Pull method. Therefore, the light receiving element 4 is placed on the near side or on the far side with respect to the light spot of the non-diffraction light 80. Here, the light receiving element 4 is placed on the far side. Thus, the light beam having a certain size focuses on border portions of the light receiving portions A to D. Therefore, by carrying out adjustment so that outputs of these four light receiving portions are equal to each other, it is possible to carry out the position adjustment of the non-diffraction light 80 and the light receiving element 4, and the position adjustment of the second support substrate 12.

The following will explain a method for adjusting the first support substrate 11 and the second support substrate 12. The output signals of the light receiving portions A to N shown in FIG. 7 are termed Sa to Sn, respectively. The light receiving portions A, B, C, and D detect the non-diffraction light 80. The RF signal is detected by utilizing the light 80 received by the light receiving portions A, B, C, and D. Moreover, the tracking error signal is detected by utilizing the light 80 and by the differential detection and Push-Pull method. Moreover, the light receiving portions E, F, G, and H detect the 1st order diffraction light 81 generated from the outgoing light beam by the polarization diffraction element 20, and uses the tracking error signal, obtained by the light receiving portions A, B, C, and D, so as to generate the tracking error signal by DPP method. The light receiving portions I to N detect the 1st order diffraction light 81 generated from the returning light beam by the polarization diffraction element 20, and detects the focus error signal by Double Knife Edge method.

The following will explain an adjusting method regarding the light receiving element 4 having the light receiving portions configured as above. First, using the non-diffraction light 80, the position adjustment of the first support substrate 11 and the position adjustment of the second support substrate 12 are carried out so that the amounts of light entering into the light receiving portions A, B, C, and D are equal to each other. Next, the polarization diffraction element 20 is rotated and adjusted so that the light receiving portions I to L output output signals Si to Sl. In this way, the polarization diffraction element 20 is roughly adjusted. The following will explain a method for fine adjusting the polarization diffraction element 20.

Regarding the fine adjustment, the position adjustment of the second support substrate 12 can be carried out based on results of the following formulas using light detection outputs from the light receiving portions. That is, the following formula is used regarding the X direction.

(Si+Sj)−(Sk+Sl)

Moreover, the following formula is used regarding the Y direction.

(Si+Sj)+(Sk+Sl)−(Sm+Sn)

In the optical integrated unit, there are various patterns of the light receiving portions of the light receiving element 4 and various patterns of the polarization diffraction element 20, and the calculation method is determined accordingly depending on the patterns of the light receiving portions and the pattern of the polarization diffraction element 20.

Further, the above-described embodiment uses the semiconductor laser 3 as the light source, however the present invention is not limited to this. For example, the light source may be a light emitting element using an organic material.

The following will explain another configuration of the optical integrated unit of the present invention. For ease of explanation, the same reference numerals are used for the members having the same functions as the members shown in FIGS. 1 to 7, and the explanations thereof are omitted.

As with the optical integrated unit 50 shown in FIG. 1, etc., the optical integrated unit 50 shown in FIG. 8 includes the first support substrate 11, the second support substrate 12, the light dividing section 2, the semiconductor laser 3 that is the light source, the light receiving element 4, and the cover glass 5 provided between the light receiving element 4 and the light dividing section 2. The difference between the configuration of FIG. 8 and the configurations of FIG. 1, etc. is that the polarization diffraction element 20 is adhered to a surface of the light dividing section 2, the surface being opposite a surface facing the light source.

By integrating the polarization diffraction element 20 and the optical integrated unit 50, it is possible to provide an optical integrated unit that is smaller than the optical integrated unit shown in FIG. 1, etc., and an optical pickup apparatus using this optical integrated unit.

The polarization diffraction element 20 includes one or both of (i) a polarization diffraction grating for generating three beams and (ii) a polarization diffraction grating for generating a control signal.

The following will explain another configuration of the optical integrated unit of the present invention. For ease of explanation, the same reference numerals are used for the members having the same functions as the members shown in FIGS. 1 to 7, and the explanations thereof are omitted.

As with the optical integrated unit 50 shown in FIG. 1, etc., the optical integrated unit 50 shown in FIG. 9 includes the first support substrate 11, the second support substrate 12, the light dividing section 2, the semiconductor laser 3 that is the light source, the light receiving element 4, and the cover glass 5 provided between the light receiving element 4 and the light dividing section 2. The differences between the configuration of FIG. 9 and the configurations of FIG. 1, etc. are that (i) a light receiving unit 37 is provided at a surface of the light dividing section 2, the surface being perpendicular to an X axis and (ii) the first surface 13 does not allow the entire light beam, emitted from the semiconductor laser 3, to pass through, but reflects part of the light beam so as to guide it to the light receiving unit 37.

The output signal from the light receiving unit 37 is input to an automatic laser power control circuit (APC), and is used for stabilizing the output of the semiconductor laser 3. Moreover, the light receiving unit 37 is adhered to the light dividing section 2 with an adhesive agent. Thus, it is possible to provide a reliable optical integrated unit and an optical pickup apparatus using this optical integrated unit.

An optical integrated unit of the present invention is included in an optical pickup apparatus which carries out recording and reproduction using an information recording medium, such as an optical disc, the optical integrated unit includes: a light source; at least one light receiving element; a light dividing section which divides outgoing light from the light source and returning light from the optical disc, and reflects the returning light so as to guide it to the light receiving element; and a support substrate, the support substrate is concave, the light dividing section includes at least three prisms, the prisms on both sides of the light dividing section are respectively adhered to two protrusions of the concave support substrate, and the light receiving element is adhered to the light dividing section via a cover glass.

Therefore, the light receiving element is adhered to the light dividing section via only the cover glass. As compared with a case where the light dividing section and the light receiving element are adhered to each other via the support substrate and the relay substrate, the optical integrated unit of the present invention is not affected by the thickness error of the relay substrate and the support substrate. In addition, the position adjustment and adhesion of the light receiving element can be carried out with an insignificant length error of the light path. Thus, it is possible to provide an inexpensive, reliable optical integrated unit which require few steps for adjustment, and an optical pickup apparatus using this optical integrated unit.

Further, the light dividing section includes at least three prisms, and the prisms on both sides of the light dividing section are respectively adhered to two protrusions of the concave support substrate. Therefore, it is possible to provide a reliable optical integrated unit and optical pickup apparatus each having high vibration resistance and high impact resistance.

Further, respective surfaces, facing the light source, of the prisms on both sides of the light dividing section are on the same plane. Therefore, these prisms can be adhered to one surface of the support substrate. Thus, the light dividing section does not incline, and can be adhered to the support substrate highly accurately. Therefore, it is possible to provide a reliable optical integrated unit and an optical pickup apparatus using this optical integrated unit.

Further, in the case of adhering the light dividing section and the support substrate at two or more places, two or more ultraviolet curing adhesive agents having different adhesive strengths are used. In this way, even in the case in which the volume of the light dividing section and/or the volume of the support substrate change due to the temperature change, the stress is released, and the distortion between the light dividing section and the support substrate does not occur. Thus, it is possible to provide a reliable optical integrated unit and an optical pickup apparatus using this optical integrated unit.

The adhesive agent applied to a prism through which the outgoing light first passes has lower adhesive strength than the adhesive agent applied to another prism. Therefore, even in the case in which the stress is generated between the light dividing section and the support substrate due to the temperature change, the stress is released toward the side where the adhesive agent having lower adhesive strength is used. That is, the stress is released toward the prism opposite the prism through which the outgoing light first passes. On this account, the prism through which the outgoing light first passes changes little. Thus, it is possible to a reliable, temperature-resistant optical integrated unit and optical pickup apparatus.

Further, a wiring is provided on a surface of the light receiving element, the surface being opposite a surface to which the light dividing section is adhered. Therefore, the optical integrated unit of the present invention is not affected by the thickness error of the relay substrate. The position adjustment and adhesion of the light receiving element can be carried out with an insignificant length error of the light path. On this account, it is possible to provide an inexpensive, reliable optical integrated unit which requires few steps for adjustment, and an optical pickup apparatus using this optical integrated unit.

Further, the light receiving element and the support substrate are adhered to each other by the adhesive agent whose adhesive strength is lower than that of the adhesive agent applied to the prism through which the outgoing light first passes. In this way, the adhesive strength between the light receiving element and the support substrate can be enhanced.

Moreover, even in the case in which the volume of the light dividing section changes due to the temperature change and the stress is applied to the light receiving element, the stress can be released because the adhesive strength of the adhesive agent applied between the light receiving element and the support substrate is low. On this account, it is possible to provide a reliable, temperature-resistant optical integrated unit which has high vibration resistance and high impact resistance, and an optical pickup apparatus using this optical integrated unit.

Further, the wiring is adhered to the support substrate by an adhesive agent whose adhesive strength is lower than that of the adhesive agent applied to the prism through which the outgoing light first passes. In this way, the adhesive strength between the wiring and the support substrate can be enhanced. Moreover, even in the case in which the volume of the light dividing section changes due to the temperature change and the stress is applied to the wiring, the stress can be released because the adhesive strength of the adhesive agent applied between the wiring and the support substrate is low. On this account, it is possible to provide a reliable, temperature-resistant optical integrated unit which has high vibration resistance and high impact resistance, and an optical pickup apparatus using this optical integrated unit.

Further, the support substrate includes a first support substrate for supporting the light source and a second support substrate for supporting the light dividing section. Therefore, the position adjustment of the light source and the position adjustment of the light dividing section can be carried out separately. Thus, it is possible to provide a reliable optical integrated unit, and an optical pickup apparatus using this optical integrated unit.

Further, a control signal can be generated by combining the optical integrated unit and a polarization diffraction element. Thus, it is possible to provide a reliable optical integrated unit, and an optical pickup apparatus using this optical integrated unit.

Further, by adhering the polarization diffraction element and a surface of the light dividing section, the surface being opposite a surface facing the light source, it is possible to miniaturize the optical integrated unit. Thus, it is possible to provide an inexpensive optical integrated unit, and an optical pickup apparatus using this optical integrated unit.

Further, the polarization diffraction element includes one or both of (i) a polarization diffraction grating for generating three beams and (ii) a polarization diffraction grating for generating a control signal. Therefore, the polarization diffraction element can generate a control signal. Thus, it is possible to provide a reliable optical integrated unit, and an optical pickup apparatus using this optical integrated unit.

An optical integrated unit of the present invention may be configured so as to include: a light dividing section which divides outgoing light from a light source and returning light from an optical disc, and reflects the returning light so as to guide it to a light receiving element; and a support substrate, and both sides of the light dividing section may be adhered to the support substrate so that the center of the light dividing section positions at the center of the outgoing light axis or almost at the center of the outgoing light axis, and the light receiving element may be adhered to the light dividing section via the cover glass.

That is, the light beam emitted from the light source passes through the light dividing section, and focuses on an information recording medium, such as an optical disc. The returning light from the information recording medium is reflected by the light dividing section, and is guided to the light receiving element. Here, the light receiving element or the cover glass is directly adhered to the light dividing section.

Figure 10A:
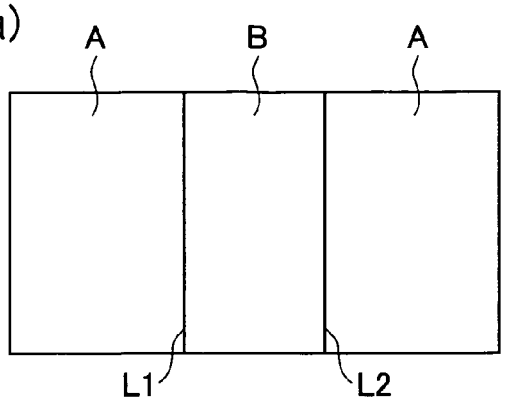
FIGS. 10(a) to 10(d) are diagrams each showing that a contact surface, adhered to the support substrate, of the light dividing section is divided into regions.
Figure 10B:
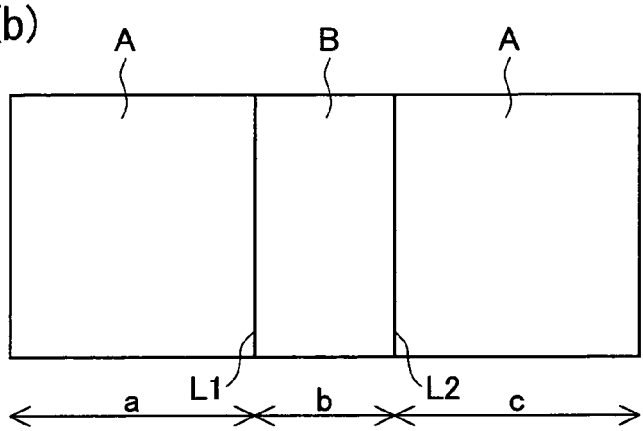
Figure 10C:
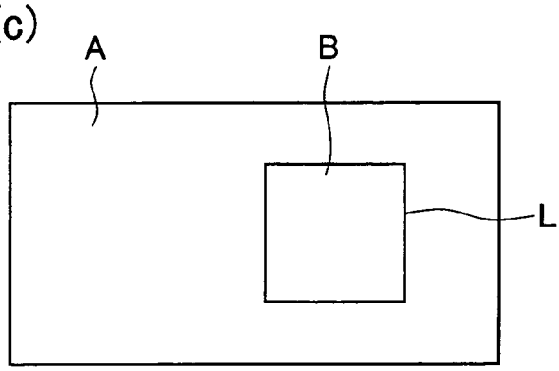
Figure 10D:
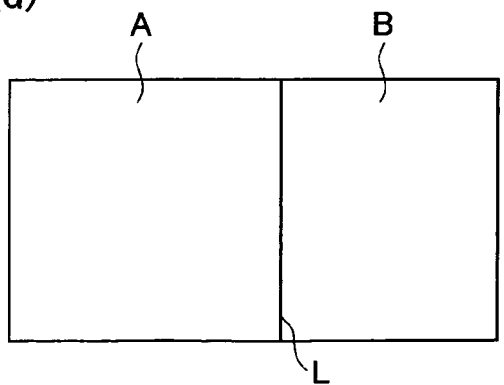

Further, a region (the region A shown on the right side of FIG. 10(a) or 10(b)) that is not a light path is provided in the light dividing section. With this, both sides of the light dividing section can be adhered to the support substrate.

By directly adhering the light dividing section and the light receiving element, or by adhering the light dividing section and the light receiving element via the cover glass, adjustment can be carried out highly accurately.

By adhering the light dividing section (glass material) and the cover glass (glass material), the linear expansion coefficients of the light dividing section and the cover glass become similar or identical with each other. Therefore, it is possible to suppress deformation caused by the temperature change, shifting of the light path, and an optical offset.

Moreover, since both sides of the light dividing section are adhered to the support substrate, it is possible to obtain high adhesive strength.

Moreover, a signal of the light receiving element is taken by FPC from a surface (a lower surface in the figures) of the light receiving element, the surface being opposite a light receiving surface.

Therefore, unlike a conventional configuration having the wiring which is provided between the light dividing section and the light receiving element and takes a signal from the light receiving element, the light receiving element and the prism can be adjusted separately, and this adjustment with respect to the displacement can be carried out drastically. Further, electrically poor connection hardly occurs.

Note that an optical integrated unit of the present invention may be configured (I) so as to (i) be included in an optical pickup apparatus which carries out recording and reproduction using an information recording medium, such as an optical disc, and (ii) include: a light source, at least one light receiving element; a light dividing section which divides outgoing light from the light source and returning light from the optical disc, and reflects the returning light so as to guide it to the light receiving element; and a support substrate, and (II) so that the support substrate is concave, the light dividing section includes at least three prisms, the prisms on both sides of the light dividing section are respectively adhered to two protrusions of the concave support substrate, and the light receiving element is adhered to the light dividing section via a cover glass.

Moreover, in the above-described configuration, the optical integrated unit of the present invention may be configured so that respective surfaces, facing the light source, of the prisms on both sides are on the same plane.

Moreover, in the above-described configuration, the optical integrated unit of the present invention may be configured so that two or more ultraviolet curing adhesive agents having different adhesive strength are used in the case of adhering the light dividing section and the support substrate at two or more places.

Moreover, in the above-described configuration, the optical integrated unit of the present invention may be configured so that the adhesive strength of an adhesive agent applied to a prism through which the outgoing light first passes is lower than that of an adhesive agent applied to another prism.

Moreover, in the above-described configuration, the optical integrated unit of the present invention may be configured so that a wiring is provided on a surface of the light receiving element, the surface being opposite a surface to which a light dividing section is adhered.

Moreover, in the above-described configuration, the optical integrated unit of the present invention may be configured so that the light receiving element is adhered to the support substrate by an adhesive agent whose adhesive strength is lower than that of an adhesive agent applied to a member through which the outgoing light first passes.

Moreover, in the above-described configuration, the optical integrated unit of the present invention may be configured so that the wiring is adhered to the support substrate by an adhesive agent whose adhesive strength is lower than that of an adhesive agent applied to a prism through which the outgoing light first passes.

Moreover, in the above-described configuration, the optical integrated unit of the present invention may be configured so that the support substrate includes a first support substrate for supporting the light source and a second support substrate for supporting the light dividing section.

Moreover, in the above-described configuration, the optical integrated unit of the present invention may be configured (I) so as to (i) be included in an optical pickup apparatus which carries out recording and reproduction using an information recording medium, such as an optical disc, and (ii) include: a light source; at least one light receiving element; a light dividing section which divides outgoing light from the light source and returning light from the optical disc, and reflects the returning light so as to guide it to the light receiving element; and a support substrate, and (II) so that the support substrate is concave, the light dividing section includes at least three prisms, the prisms on both sides of the light dividing section are respectively adhered to two protrusions of the concave support substrate, and the light receiving element is adhered to the light dividing section via a cover glass.

Moreover, in the above-described configuration, the optical integrated unit of the present invention may be configured so that the polarization diffraction element is adhered to a surface of the light dividing section, the surface being opposite a surface facing the light source.

Moreover, in the above-described configuration, the optical integrated unit of the present invention may be configured so that the polarization diffraction element includes one or both of (i) a polarization diffraction grating for generating three beams and (ii) a polarization diffraction grating for generating a control signal.

Moreover, an optical pickup apparatus of the present invention may be configured so as to include the above-described optical integrated unit.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to (i) an optical integrated unit for realizing miniaturization of an optical pickup used when recording information to or reproducing information from an information recording medium such as an optical disc, and (ii) an optical pickup apparatus using this optical integrated unit.

What is claimed is:
1. An optical integrated unit comprising:
a light guiding section for guiding a light beam, emitted from a light source and reflected by a recording medium, to a light receiving element in a light receiving unit; and a second support substrate, provided between the light source and the light guiding section, for fixing the light source and the light guiding section, the light receiving unit having a cover glass on a light incidence surface of the light receiving element;

the light guiding section having a contact surface which faces the light source, the second support substrate having a surface which contacts the contact surface of the light guiding section and has a depressed region, the light source being adhered to a first support substrate so as to face a substrate adhering region of the contact surface of the light guiding section, such that the substrate adhering region does not face the depressed region;

the light receiving unit being provided inside the depressed region;

the cover glass of the light receiving unit being directly adhered to a light receiving unit adhering region of the contact surface of the light guiding section, the light receiving unit adhering region facing the depressed region.

2. The optical integrated unit as set forth in claim 1, wherein:

the light receiving unit adhering region and the substrate adhering region are obtained by dividing the contact surface by a border line and a straight line crossing the contact surface; and the light receiving unit adhering region is not located at an edge of the contact surface.

3. The optical integrated unit as set forth in claim 1, wherein:

the light guiding section includes at least three prisms that are a first prism, a second prism, and a third prism which are adhered to each other in this order;

a surface between the first prism and the second prism allows outgoing light to pass through so that the outgoing light travels from the light source to the recording medium, and which reflects returning light so that the returning light travels from the recording medium to the light receiving element;

a surface between the second prism and the third prism reflects the returning light from the surface between the first prism and the second prism so that the returning light travels from the recording medium to the light receiving element; and the first prism on one end of the light guiding section has a surface facing the light source, a last prism on another end of the light guiding section has a surface facing the light source, and these surfaces are on a same plane.

4. The optical integrated unit as set forth in claim 3, wherein an adhesive strength of an adhesive agent applied to a prism through which the outgoing light first passes is lower than that of an adhesive agent applied to another prism.

5. The optical integrated unit as set forth in claim 1, wherein the light receiving element has, on a surface thereof, a wiring through which an output signal of the light receiving element passes, the surface being opposite a surface to the light incidence surface of the light receiving element.

6. The optical integrated unit as set forth in claim 1, wherein an adhesive strength of an adhesive agent applied to a region, on the light guiding section, through which the outgoing light first passes is lower than that of an adhesive agent applied to a region, on the light guiding section, to which the light receiving element is adhered.

7. The optical integrated unit as set forth in claim 1, wherein, an adhesive strength of an adhesive agent applied to a region, on the light guiding section, through which the outgoing light passes is lower than that of an adhesive agent applied to a region, on the light guiding section, where a wiring through which an output signal of the light receiving element passes is adhered to the second support substrate.

8. The optical integrated unit as set forth in claim 1, further comprising a polarization diffraction element on a surface of the light guiding section, the surface being opposite a surface facing the light source.

9. The optical integrated unit as set forth in claim 8, wherein the polarization diffraction element includes one or both of a polarization diffraction element for generating three beams and a polarization diffraction element for generating a control signal.

10. An optical pickup apparatus comprising an optical integrated unit including:

a light guiding section for guiding a light beam, emitted from a light source and reflected by a recording medium, to a light receiving element; and a second support substrate, provided between the light source and the light guiding section, for fixing the light source and the light guiding section, the light guiding section having a contact surface which faces the light source, the second support substrate having a surface which contacts the contact surface of the light guiding section and has a depressed region, the light source being adhered to a first support substrate so as to face a substrate adhering region of the contact surface of the light guiding section, such that the substrate adhering region does not face the depressed region, and the light receiving element being directly adhered to a light receiving unit adhering region of the contact surface of the light guiding section, the light receiving unit adhering region facing the depressed region.

11. An optical pickup apparatus comprising:

a light guiding section for guiding a light beam, emitted from a light source and reflected by a recording medium, to a light receiving element in a light receiving unit;

a second support substrate, provided between the light source and the light guiding section, for fixing the light source and the light guiding section;

the light receiving unit having a cover glass on a light incidence surface of the light receiving element;

the light guiding section having a contact surface which faces the light source;

the second support substrate having a surface which contacts the contact surface of the light guiding section and has a depressed region;

the light source being adhered to a first support substrate so as to face a substrate adhering region of the contact surface of the light guiding section, such that the substrate adhering region does not face the depressed region; and the cover glass of the light receiving unit being directly adhered to a light receiving unit adhering region facing the depressed region.

* * * * *